United States Patent
Ye et al.

(10) Patent No.: US 9,822,214 B2
(45) Date of Patent: Nov. 21, 2017

(54) CURABLE COMPOSITIONS

(71) Applicant: Blue Cube IP LLC, Midland, MI (US)

(72) Inventors: Simon Ye, Shanghai (CN); Tianhui Xiao, Shanghai (CN); Hongyu Chen, Shanghai (CN); Michael J. Mullins, Midland, MI (US); Yu Cai, Shanghai (CN); Jiawen Xiong, Shanghai (CN); Joey W. Storer, Midland, MI (US); Mark B. Wilson, Midland, MI (US); Frank Y. Gong, Shanghai (CN)

(73) Assignee: BLUE CUBE IP LLC, Midland, MI (US)

( * ) Notice: Subject to any disclaimer, the term of this patent is extended or adjusted under 35 U.S.C. 154(b) by 0 days.

(21) Appl. No.: 14/907,439

(22) PCT Filed: Jul. 24, 2014

(86) PCT No.: PCT/US2014/047930
§ 371 (c)(1),
(2) Date: Jan. 25, 2016

(87) PCT Pub. No.: WO2015/013473
PCT Pub. Date: Jan. 29, 2015

(65) Prior Publication Data
US 2016/0194438 A1    Jul. 7, 2016

(30) Foreign Application Priority Data
Jul. 24, 2013 (WO) ................ PCT/CN2013/080024

(51) Int. Cl.
*C08G 59/42* (2006.01)
*C08L 63/00* (2006.01)
*C08J 5/24* (2006.01)
*C09D 163/00* (2006.01)

(52) U.S. Cl.
CPC ..... *C08G 59/4238* (2013.01); *C08G 59/4261* (2013.01); *C08J 5/24* (2013.01); *C08L 63/00* (2013.01); *C09D 163/00* (2013.01); *C08J 2363/00* (2013.01); *C08J 2425/08* (2013.01)

(58) Field of Classification Search
CPC ................................................ C08G 59/4238
See application file for complete search history.

(56) References Cited

U.S. PATENT DOCUMENTS 3,997,499 A * 12/1976 Heilman ............... C08F 283/10
525/112
2011/0224332 A1* 9/2011 He ......................... C08G 59/42
523/456

FOREIGN PATENT DOCUMENTS

WO     WO 2013000151 A1 *  1/2013 ................ C08J 5/24

* cited by examiner

*Primary Examiner* — Megan McCulley
(74) *Attorney, Agent, or Firm* — Polsinelli PC

(57) ABSTRACT

Embodiments include curable compositions including an epoxy resin and a hardener component including a polymer having first constitutional unit, a second constitutional unit, and a third constitutional unit, where the epoxy group to the second constitutional unit has a molar ratio in a range of 0.5:1 to 5:1. Embodiments include prepregs that include a reinforcement component and the curable composition and an electrical laminate formed with the curable composition.

20 Claims, No Drawings

CURABLE COMPOSITIONS

FIELD OF DISCLOSURE

Embodiments of the present disclosure relate to curable compositions and in particular to curable compositions that include polymers and a method of producing the curable compositions.

BACKGROUND

Curable compositions are compositions that include thermosettable monomers that can be crosslinked. Crosslinking, also referred to as curing, converts the curable compositions into crosslinked polymers (i.e., a cured product) useful in various fields such as, for example, in the field of composites, electrical laminates and coatings. Some properties of curable compositions and crosslinked polymers that can be considered for particular applications include mechanical properties, thermal properties, electrical properties, optical properties, processing properties, among other physical properties.

For example, glass transition temperature, dielectric constant and dissipation factor can be properties that are considered as highly relevant for curable compositions used for electrical laminates. For example, having a sufficiently high glass transition temperature for an electrical laminate can be very important in allowing the electrical laminate to be effectively used in high temperature environments. Similarly, decreasing the dielectric constant and dissipation factor of the electrical laminate can assist in separating a current carrying area from other areas.

To achieve desirable changes in glass transition temperature ($T_g$), dielectric constant ($D_k$) and dissipation factor ($D_f$), previous approaches have added various materials to curable compositions. For example, materials have been added to the curable composition to decrease the dielectric constant and dissipation factor. While adding these materials to the curable composition may decrease the dielectric constant and dissipation factor, which is desirable, these materials can also adversely alter other properties such as decreasing the glass transition temperature, which is undesirable. Therefore, additional materials are added to increase the glass transition temperature. For example, previous approaches have added poly(styrene-co-maleic anhydride) (SMA) to decrease the $D_k$ and $D_f$. However, this results in less than ideal Df and $T_g$ values, and consequently other materials are needed to further decrease Df and increase $T_g$. Examples of these materials include cyanates. However, cyanates can be expensive and increase the cost of production for electrical laminates. Therefore, an affordable electrical laminate with desirable thermal properties and electrical properties would be beneficial.

SUMMARY

In an embodiment of the present invention, there is disclosed a curable composition comprising, consisting of, or consisting essentially of: an epoxy resin; and a hardener compound for curing with the epoxy resin, the hardener compound comprising: a polymer comprising a first constitutional unit having a formula of

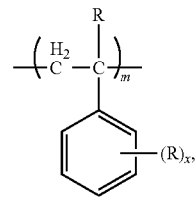

a second constitutional unit having a formula of

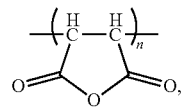

and a third constitutional unit having a formula selected from the group consisting of

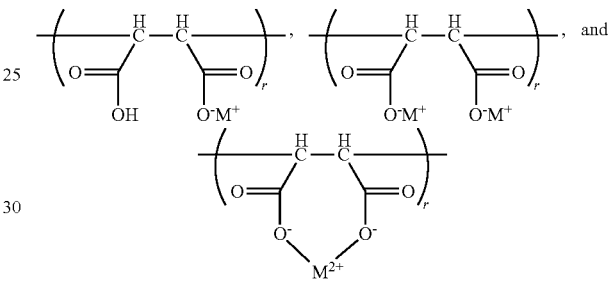

wherein each m, n, and r is independently a real number that represents a mole fraction of the respective constitutional unit in the polymer, each R is independently a hydrogen, a halogen, an aromatic group or an aliphatic group, $M^+$ and $M^{2+}$ are metal ions and wherein the molar ratio of the epoxy group to the second constitutional unit is in the range of from 0.5:1 to 5:1.

DETAILED DESCRIPTION

Embodiments of the present disclosure provide for curable compositions. For the various embodiments, the curable compositions of the present disclosure have a hardener component that includes a polymer. The curable compositions of the present disclosure provide a cured product having desirable thermal properties and electrical properties. The desirable thermal properties can include glass transition temperature and degradation temperature, and the desirable electrical properties can include dielectric constant and dissipation factor. The cured products of the curable compositions of the present disclosure can be useful for electrical encapsulates, composites, electrical laminates, adhesives, prepregs and/or powder coatings.

As used herein, "constitutional units" refer to the smallest constitutional unit (a group of atoms comprising a part of the essential structure of a macromolecule), or monomer, the repetition of which constitutes a macromolecule, such as a polymer.

As used herein, "a," "an," "the," "at least one," and "one or more" are used interchangeably. The term "and/or" means one, one or more, or all of the listed items. The recitations of numerical ranges by endpoints include all numbers subsumed within that range (e.g., 1 to 5 includes 1, 1.5, 2, 2.75, 3, 3.80, 4, 5, etc.).

For one or more embodiments, the curable compositions include an epoxy resin. An epoxy group is a group with an oxygen atom directly attached to two adjacent or non-adjacent carbon atoms of a carbon chain or ring system. The epoxy resin can be selected from the group consisting of aromatic epoxy resins, alicyclic epoxy resins, aliphatic epoxy resins, and combinations thereof.

For one or more embodiments, the curable compositions include an aromatic epoxy resin. Examples of aromatic epoxy resins include, but are not limited to, glycidyl ether compounds of polyphenols, such as hydroquinone, resorcinol, bisphenol A, bisphenol F, 4,4'-dihydroxybiphenyl, phenol novolac, cresol novolac, trisphenol (tris-(4-hydroxyphenyl)methane), 1,1,2,2-tetra(4-hydroxyphenyl)ethane, tetrabromobisphenol A, 2,2-bis(4-hydroxyphenyl)-1,1,1,3,3,3-hexafluoropropane, 1,6-dihydroxynaphthalene, and combinations thereof.

For one or more embodiments, the curable compositions include an alicyclic epoxy resin. Examples of alicyclic epoxy resins include, but are not limited to, polyglycidyl ethers of polyols having at least one alicyclic ring, or compounds including cyclohexene oxide or cyclopentene oxide obtained by epoxidizing compounds including a cyclohexene ring or cyclopentene ring with an oxidizer. Some particular examples include, but are not limited to, hydrogenated bisphenol A diglycidyl ether; 3,4-epoxycyclohexylmethyl-3,4-epoxycyclohexyl carboxylate; 3,4-epoxy-1-methylcyclohexyl-3,4-epoxy-1-methylhexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate; bis(3,4-epoxycyclohexylmethyl)adipate; methylene-bis(3,4-epoxycyclohexane); 2,2-bis(3,4-epoxycyclohexyl)propane; dicyclopentadiene diepoxide; ethylene-bis(3,4-epoxycyclohexane carboxylate); dioctyl epoxyhexahydrophthalate; di-2-ethylhexyl epoxyhexahydrophthalate; and combinations thereof.

For one or more embodiments, the curable compositions include an aliphatic epoxy resin. Examples of aliphatic epoxy resins include, but are not limited to, polyglycidyl ethers of aliphatic polyols or alkylene-oxide adducts thereof, polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers. Some particular examples include, but are not limited to glycidyl ethers of polyols, such as 1,4-butanediol diglycidyl ether; 1,6-hexanediol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol; and a diglycidyl ether of polypropylene glycol; polyglycidyl ethers of polyether polyols obtained by adding one type, or two or more types, of alkylene oxide to aliphatic polyols such as propylene glycol, trimethylol propane, and glycerin; diglycidyl esters of aliphatic long-chain dibasic acids; and combinations thereof.

For the various embodiments, the hardener compound comprises a polymer having a first constitutional unit of the formula (I), as depicted below:

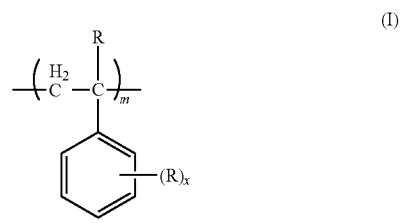

a second constitutional unit of the formula (II), as depicted below:

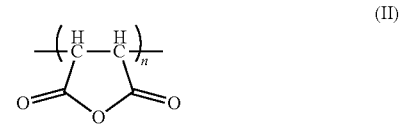

and a third constitutional unit having a formula selected from the group consisting of formulas (III), (IV), and (V), as depicted below:

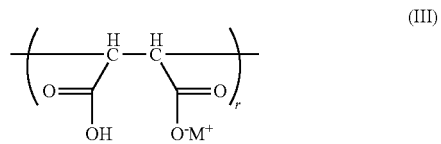

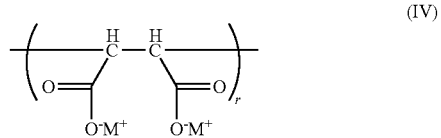

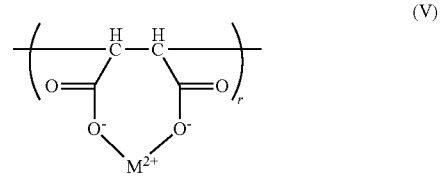

where each m, n, and r is independently a real number that represents a mole fraction of the respective constitutional unit in the polymer, each R is independently a hydrogen, a halogen, an aromatic group or an aliphatic group, and where the epoxy group to the second constitutional unit has a molar ratio in a range of from 0.5:1 to 5:1. In various embodiments, each R is hydrogen. $M^+$ and $M^{2+}$ represent metal ions. $M^+$ has an oxidation state of +1 and $M^{2+}$ has an oxidation state of +2.

For various embodiments, the second constitutional unit constitutes 4 percent (%) to 49% by weight of the polymer. In one embodiment, the second constitutional unit is present in an amount in the range of from 10% to 25% by weight of the polymer.

For various embodiments, the third constitutional unit constitutes 0.0056% to 9.3% by weight of the polymer. In one embodiment, the third constitutional unit constitutes 0.17% by weight of the polymer.

A styrenic compound, as used herein, includes the compound styrene having the chemical formula $C_6H_5CH=CH_2$ and compounds derived therefrom (e.g., styrene derivatives), unless explicitly stated otherwise. Maleic anhydride, which may also be referred to as cis-butenedioic anhydride, toxilic anhydride, or dihydro-2,5-dioxofuran, has a chemical formula: $C_2H_2(CO)_2O$. In an embodiment, the first and second constitutional unit is a styrene and maleic anhydride copolymer.

As discussed herein, styrene and maleic anhydride copolymers have been used in curable compositions. Commercial examples of such styrene and maleic anhydride copolymer include, but are not limited to, SMA® 1000, SMA® 2000, SMA® 3000, SMA® EF-30, SMA® EF-40, SMA® EF-60, and SMA® EF-80 all of which are available from Cray Valley.

For various embodiments, the styrene and maleic anhydride copolymer can have a weight average molecular weight from 2,000 to 20,000; for example, the copolymer can have a weight average molecular weight from 3,000 to 11,500. The weight average molecular weight can be determined by gel permeation chromatography (GPC).

For various embodiments, the styrene and maleic anhydride copolymer can have a molecular weight distribution from 1.1 to 6.1; for example, the copolymer can have a molecular weight distribution from 1.2 to 4.0.

For various embodiments, the styrene and maleic anhydride copolymer can have an acid number from 100 milligrams potassium hydroxide per gram (mg KOH/g) to 480 mg KOH/g; for example, the copolymer can have an acid number from 120 mg KOH/g to 285 mg KOH/g, or from 156 mg KOH/g to 215 mg KOH/g.

In an embodiment, the polymer further comprises a fourth constitutional unit of formula (VI), as depicted below:

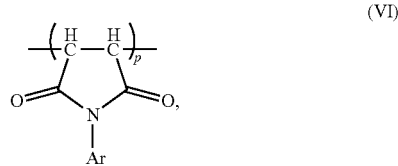

(VI)

wherein p is a real number that represents a mole fraction of the fourth constitutional unit in the polymer, and Ar is an aromatic group.

For the various embodiments, examples of the aromatic group include, but are not limited to, phenyl, biphenyl, naphthyl, substituted phenyl, substituted biphenyl, and substituted naphthyl. In an embodiment, the aromatic group is a phenyl group.

In an embodiment, the styrene and maleic anhydride copolymer is modified to include an aromatic amine compound such as aniline. The aromatic amine compound (e.g., aniline) can be used to react with part of the maleic anhydride groups in the styrene and maleic anhydride copolymer. This can result in the fourth constitutional unit, described above, being present in the polymer.

The modified polymer can be obtained by combining a copolymer with a monomer via a chemical reaction, for example, reacting a styrene and maleic anhydride copolymer with the amine compound. Additionally, the polymer can be obtained by combining more than two species of monomer via a chemical reaction (e.g., reacting a styrenic compound, maleic anhydride, and maleic acid compounds). In an embodiment, the process for modifying the styrene and maleic anhydride can include imidization. In another embodiment, the styrene and maleic anhydride can be modified to an amic acid. The reacted monomers and/or copolymers form the constitutional units of the polymer.

For various embodiments, the mole fraction m is 0.50 or greater and the mole fraction (n+p+r) is 0.50 or less, where (m+n+p+r)=1.00. For various embodiments, the first constitutional unit to the other constitutional units has a molar ratio in a range of 1:1 to 20:1. In an embodiment, the molar ratio of the first constitutional unit to the other constitutional units is in the range of from 3:1 to 6:1. The ratio of r/(n+p+r) can be in the range from 0.001 to 0.1. In one embodiment, the ratio of r/(n+p+r) is 0.007.

For various embodiments, the second constitutional unit constitutes 5% to 40% by weight of the polymer. In one embodiment, the second constitutional unit constitutes 10% to 20% by weight of the polymer.

For various embodiments, the third constitutional unit constitutes 0.03% to 5% by weight of the polymer. In one embodiment, the third constitutional unit constitutes 0.37% by weight of the polymer.

For various embodiments, the fourth constitutional unit constitutes 8% to 9% by weight of the polymer.

For the various embodiments, the curable compositions of the present disclosure are formed such that the epoxy group to the second constitutional unit of the polymer has a molar ratio in a range of 0.5:1 to 5:1; the molar ratio of the epoxy group to the second constitutional unit can be in the range of from 1.0:1.0 to 2.7:1.0 in another embodiment, 0.7:1.0 to 2.7:1.0 in yet another embodiment, 0.9:1.0 to 1.9:1.0 in another embodiment, and 1.0:1.0 to 1.7:1.0 in yet another embodiment.

For various embodiments, the curable composition can include a solvent. The solvent can be selected from the group consisting of methyl ethyl ketone (MEK), toluene, xylene, 4-methyl-2-pentanone, N,N-dimethylformamide (DMF), propylene glycol methyl ether (PM), cyclohexanone, propylene glycol methyl ether acetate (DOWANOL™ PMA), and mixtures thereof. For various embodiments, the solvent can be used in an amount of from 30% to 60% by weight based on a total weight of the curable composition.

For various embodiments, the curable compositions can include a catalyst. Examples of the catalyst include, but are not limited to, 2-methyl imidazole (2MI), 2-phenyl imidazole (2PI), 2-ethyl-4-methyl imidazole (2E4MI), 1-benzyl-2-phenylimidazole (1B2PZ), boric acid, triphenylphosphine (TPP), tetraphenylphosphonium-tetraphenylborate (TPP-k), and combinations thereof. For the various embodiments, the catalyst (10% solution by weight) can be used in an amount of from 0.01% to 2.0% by weight based on solid component weight in curable composition.

For various embodiments, the curable compositions can include a co-curing agent. The co-curing agents can be reactive to the epoxide groups of the epoxy compounds. The co-curing agent can be selected from the group consisting of novolacs, amines, anhydrides, carboxylic acids, phenols, thiols, and combinations thereof. For the various embodiments, the co-curing agent can be used in an amount of from 1% to 90% by weight based on a weight of the polymer.

For one or more embodiments, the curable compositions include an additive. The additive can be selected from the group consisting of dyes, pigments, colorants, antioxidants, heat stabilizers, light stabilizers, plasticizers, lubricants, flow modifiers drip retardants, flame retardants, antiblocking agents, mold release agents, toughening agents, low-profile additives, stress-relief additives, and combination thereof. The additive can be employed in an effective amount for a particular application, as is understood by one having ordinary skill in the art. For different applications, the effective amount can have different values. The curable compositions of the present disclosure do not contain a cyanate group.

A flame retardant can be an additive to the curable composition, as stated above. Examples of flame retardants include, but are not limited to halogenated and non-halogenated flame retardants, including brominated and non-brominated flame retardants. Specific examples of brominated additives include tetrabromobisphenol A (TBBA) and materials derived therefrom: TBBA-diglycidyl ether, reaction products of bisphenol A or TBBA with TBBA-diglycidyl ether, and reaction products of bisphenol A diglycidyl ether with TBBA.

Non-brominated flame retardants include the various materials derived from DOP (9,10-dihydro-9-oxa-10-phosphaphenanthrene 10-oxide) such as DOP-hydroquinone (10-(2',5'-dihydroxyphenyl)-9,10-dihydro-9-oxa-10-phosphaphenanthrene 10-oxide), condensation products of DOP with glycidylether derivatives of novolacs, and inorganic flame retardants such as aluminum trihydrate, aluminum hydroxide (Boehmite) and aluminum phosphinite. If inorganic flame retardant fillers are used, silane treated grades are preferred.

For one or more embodiments, the curable composition can have a gel time of 200 seconds (s) to 400 s at 171° C. including all individual values and/or subranges therein; for example the curable compositions can have a gel time of 205 s to 395 s at 171° C., or 210 s to 390 s at 171° C.

Gel time can indicate a reactivity of the curable compositions (e.g., at a specific temperature) and can be expressed as the number of seconds to gel point. Gel point refers to the point of incipient polymer network formation wherein the structure is substantially ramified such that essentially each unit of the network is connected to each other unit of the network. When a curable composition reaches the gel point, the remaining solvent becomes entrapped within the substantially ramified structure. When the trapped solvent reaches its boiling point, bubbles can be formed in the structure (e.g., the prepreg, resulting in an undesirable product).

As discussed herein, for one or more embodiments, the curable compositions have a gel time of 200 s to 400 s at 171° C. In some instances curable compositions having a gel time that is greater than 400 s at 171° C. can be modified by adding a catalyst and/or an additive, as discussed herein, to adjust the gel time to 200 s to 400 s at 171° C., 200 s to 375 s at 171° C., or 200 s to 350 s at 171° C. For some applications, curable compositions having a gel time of less than 200 s at 171° C. can be considered too reactive relative to equipment processing rates.

Embodiments of the present disclosure provide prepregs that includes a reinforcement component and the curable composition, as discussed herein. The prepreg can be obtained by a process that includes impregnating a matrix component into the reinforcement component. The matrix component surrounds and/or supports the reinforcement component. The disclosed curable compositions can be used for the matrix component. The matrix component and the reinforcement component of the prepreg provide a synergism. This synergism provides that the prepregs and/or products obtained by curing the prepregs have mechanical and/or physical properties that are unattainable with only the individual components.

The reinforcement component can be a fiber. Examples of fibers include, but are not limited to, glass, aramid, carbon, polyester, polyethylene, quartz, metal, ceramic, biomass, and combinations thereof. The fibers can be coated. An example of a fiber coating includes, but is not limited to, boron.

Examples of glass fibers include, but are not limited to, A-glass fibers, E-glass fibers, C-glass fibers, R-glass fibers, S-glass fibers, T-glass fibers, and combinations thereof. Aramids are organic polymers, examples of which include, but are not limited to, Kevlar®, Twaron®, and combinations thereof. Examples of carbon fibers include, but are not limited to, those fibers formed from polyacrylonitrile, pitch, rayon, cellulose, and combinations thereof. Examples of metal fibers include, but are not limited to, stainless steel, chromium, nickel, platinum, titanium, copper, aluminum, beryllium, tungsten, and combinations thereof. Examples of ceramic fibers include, but are not limited to, those fibers formed from aluminum oxide, silicon dioxide, zirconium dioxide, silicon nitride, silicon carbide, boron carbide, boron nitride, silicon boride, and combinations thereof. Examples of biomass fibers include, but are not limited to, those fibers formed from wood, non-wood, and combinations thereof.

The reinforcement component can be a fabric. The fabric can be formed from the fiber, as discussed herein. Examples of fabrics include, but are not limited to, stitched fabrics, woven fabrics, and combinations thereof. The fabric can be unidirectional, multiaxial, and combinations thereof. The reinforcement component can be a combination of the fiber and the fabric.

The prepreg is obtainable by impregnating the matrix component into the reinforcement component. Impregnating the matrix component into the reinforcement component may be accomplished by a variety of processes. The prepreg can be formed by contacting the reinforcement component and the matrix component via rolling, dipping, spraying, or other such procedures. After the prepreg reinforcement component has been contacted with the prepreg matrix component, the solvent can be removed via volatilization. While and/or after the solvent is volatilized the prepreg matrix component can be cured, e.g., partially cured. This volatilization of the solvent and/or the partial curing can be referred to as B-staging. The B-staged product can be referred to as the prepreg.

For some applications, B-staging can occur via an exposure to a temperature of 60° C. to 250° C.; for example, B-staging can occur via an exposure to a temperature from 65° C. to 240° C., or 70° C. to 230° C. For some applications, B-staging can occur for a period of time of 1 minute (min) to 60 min; for example, B-staging can occur for a period of time from, 2 min to 50 min, or 5 min to 40 min. However, for some applications the B-staging can occur at another temperature and/or another period of time.

One or more of the prepregs may be cured (e.g., more fully cured) to obtain a cured product. The prepregs can be layered and/or formed into a shape before being cured further. For some applications (e.g., when an electrical laminate is being produced) layers of the prepreg can be alternated with layers of a conductive material. An example of the conductive material includes, but is not limited to, copper foil. The prepreg layers can then be exposed to conditions so that the matrix component becomes more fully cured.

One example of a process for obtaining the more fully cured product is pressing. One or more prepregs may be placed into a press where it subjected to a curing force for a predetermined curing time interval to obtain the more fully cured product. The press may have a curing temperature of 80° C. to 250° C.; for example, the press may have a curing temperature of 85° C. to 240° C., or 90° C. to 230° C. For one or more embodiments, the press has a curing temperature that is ramped from a lower curing temperature to a higher curing temperature over a ramp time interval.

During the pressing, the one or more prepregs can be subjected to a curing force via the press. The curing force may have a value that is 10 kilopascals (kPa) to 350 kPa; for example the curing force may have a value that is 20 kPa to 300 kPa, or 30 kPa to 275 kPa. The predetermined curing time interval may have a value that is 5 s to 500 s; for example, the predetermined curing time interval may have a value that is 25 s to 540 s, or 45 s to 520 s. For other processes for obtaining the cured product other curing temperatures, curing force values, and/or predetermined curing time intervals are possible. Additionally, the process may be repeated to further cure the prepreg and obtain the cured product.

For various embodiments, the cured products formed from the curable compositions of the present disclosure, as discussed herein, can have a glass transition temperature of at least 150° C.

For various embodiments, the cured products formed from the curable compositions of the present disclosure, as discussed herein, can have a thermal degradation temperature of 300° C. to 500° C.; for example, the thermal degradation temperature can be 359° C. to 372° C., or 363° C. to 368° C.

For various embodiments, the cured products formed from the curable compositions of the present disclosure, as discussed herein, can have a dielectric constant of less than 3.1 at 1 GHz; for example, the dielectric constant at 1 GHz can be 2.9 to 3.0, or 2.8 to 2.9.

For various embodiments, the cured products formed from the curable compositions of the present disclosure, as discussed herein, can have a dissipation factor of less than 0.01 at 1 GHz; for example, the dissipation factor at 1 GHz can be 0.003 to 0.01, or 0.004 to 0.007.

EXAMPLES

Materials

SMA® EF30 (SMA 30), SMA® EF40 (SMA 40), and SMA® EF60 (SMA 60), (styrenic compound-maleic anhydride copolymer), available from Cray Valley. SMA 30 has a styrene to maleic anhydride molar ratio of 3:1, a weight average molecular weight of 9,500, a number average molecular weight of 3,800, and an acid number of 280 mg KOH/mg. SMA 40 has a styrene to maleic anhydride molar ratio of 4:1, a weight average molecular weight of 10,500, a number average molecular weight of 4,500, and an acid number of 215 mg KOH/mg. SMA 60 has a styrene to maleic anhydride molar ratio of 6:1, a weight average molecular weight of 11,500, a number average molecular weight of 5,500, and an acid number of 156 mg KOH/mg.

Aniline (amine compound), (99.0% or greater purity), available from Sigma Aldrich.

Acetic anhydride (analytical grade), available from Sigma Aldrich.

Sodium acetate (analytical grade), available from Sinopharm Chemical Co.

Sodium hydroxide (analytical grade), available from Sinopharm Chemical Co.

Sodium carbonate (analytical grade), available from Sinopharm Chemical Co.

Lithium hydroxide (analytical grade), available from Sinopharm Chemical Co.

Potassium hydroxide (analytical grade), available from Sinopharm Chemical Co.

Zinc acetate (analytical grade), available from Sinopharm Chemical Co.

Xylene (solvent), (analytical grade), available from Sinopharm Chemical Co.

Methyl ethyl ketone (solvent), (analytical grade), available from Sinopharm Chemical Co.

2-Methyl imidazole (catalyst), (analytical grade), available from Sinopharm Chemical Co.

D.E.R.™ 560 (epoxy resin), available from the Dow Chemical Company.

D.E.N.™ 438 (epoxy novolac resin), available from the Dow Chemical Company.

Tetrabromobisphenol A (99.0% or greater purity), available from Albemarle.

Aniline modified SMA polymers were prepared following the methods below:

Method I (a): Modified SMA in MEK Solution 128.28 grams of SMA 40 solution (40% in MEK) was loaded into a 250 mL 3-neck flask. The flask was equipped with a magnetic agitator, a silicone oil bath, a condenser, a nitrogen inlet, and a thermal couple, which was used to monitor the oil bath temperature. The flask was then charged with nitrogen and the flow was kept steady during the reaction.

The heating temperature was set to 80° C. 2.32 grams of aniline was then added drop wise via a dropping funnel over the course of 4 min. The temperature was held at 80° C. for 30 min.

3.06 grams of $Ac_2O$ and 6.14 grams of NaOAc were then added successively to the flask. The heating temperature was set to 90° C. in order to maintain a mild reflux for 3 hours. The heating was then stopped and the reaction mixture was cooled to room temperature. The excess NaOAc was then removed through vacuum filtration. The filter cake was then washed with a small amount of MEK and all the filtrate was combined. The solid content of the filtrate was then tested.

I (b): Modified SMA in Toluene Solution

The same procedure was followed as in method I (a) except that toluene was used as the solvent and was refluxed for 6 hours for the reaction completion.

I (c): Modified SMA in Toluene Solution without Sodium Acetate 128.30 grams of SMA 40 solution (40% in toluene) was loaded into a 250 mL 3-neck flask. The flask was equipped with a magnetic agitator, a silicon oil bath, a condenser, a nitrogen inlet, and a thermal couple, which was used to monitor the oil bath temperature. The flask was then charged with nitrogen to keep a steady flow during the reaction.

The heating temperature was set to 80° C. 2.33 grams of aniline was then added drop wise via a dropping funnel over the course of 1 minute. The solution was heated at 80° C. for 1 hour. 3.07 grams of $Ac_2O$ was then added to the flask. The heating temperature was set to 120° C. to maintain a mild reflux for 1 hour, after which the reaction mixture was cooled to room temperature. The solid content of the product solution was then tested.

Method II (a): Modified SMA in Xylene Solution with NaOH 205.32 grams of SMA 40 and 205.23 grams of xylene were charged successively into a 500 mL 4-neck flask. The flask was equipped with a mechanic agitator, a heating mantle, a condenser, a nitrogen inlet, and a thermal couple, which was used to monitor the reaction mixture temperature. The flask was then charged with nitrogen and the cooling water. During the reaction, the flows were maintained at steady and appropriate rates.

The heating temperature was set to 135° C. to accelerate the dissolution of the SMA 40. After a clear solution was formed, the temperature was reduced to 80° C. When the temperature reached 80° C., 9.31 grams of aniline was added into the flask drop-wise via a dropping funnel in 8 minutes. The flask was then heated at 80° C. for 45 minutes.

An aqueous solution of NaOH (0.168 g NaOH solid dissolved into 0.58 g water) was then added drop-wise to the flask. The flask was then equipped with a Dean-Stark apparatus. The heating temperature was set at 142° C. to make xylene reflux. The reflux was maintained for 4 hours and the water co-product was separated. The reaction mixture was then cooled to room temperature and the solid content of the product solution was then tested.

II (b): Modified SMA in Xylene Solution without any Metal Ion Additive

The procedure of method II (a) was followed, except that no metal ion additive was added and the azeotropic distillation was kept for 10 hours.

The modified SMA polymer, which was synthesized via the above mentioned procedures, had a maleic anhydride content of 14%.

Varnish Formulations

Appropriate amounts of SMA polymers, D.E.R.™ 560 and sodium hydroxide were dissolved in MEK. 2-Methyl imidazole was dissolved in methanol to form a 10 wt % solution and was added last. The final weight percent of non-volatile organics was roughly 50% by weight. Three formulations and the properties of cured epoxy systems were shown in Table 1.

TABLE 1

|  | Inventive Example 1 | Comparative Example A | Comparative Example B |
|---|---|---|---|
| SMA 60 (g) | 8.88 | 8.88 | 0 |
| SMA 30 (g) | 5.01 | 5.01 | 10.01 |
| D.E.R.™ 560 (g) | 10 | 10 | 9.99 |
| NaOH (mg) | 6.9 | 0 | 0 |
| 2-MI (mg) | 8.5 | 7.0 | 4.0 |
| Gelation time (s) | 269 | 298 | 297 |
| Cure Temp and time | 200° C. 1.5 h then 220° C. 1.5 h | 200° C. 1.5 h then 220° C. 1.5 h | 200° C. 1.5 h then 220° C. 1.5 h |
| $T_g$ (° C., DSC) | 191 | 145 | 175 |
| $T_g$ (° C., DMA) | 198 | 163 | NA |
| $T_d$ (° C.) | 358 | 353 | 358 |
| $D_k$ (1 GHz) | 2.87 | 2.90 | 3.00 |
| $D_f$ (1 GHz) | 0.0042 | 0.0049 | 0.0092 |

From the results in Table 1, composition in Comparative Example A has a lower Df than Comparative Example B which uses only SMA 30. However, the benefit to the Df was obtained at the cost of a decline in $T_g$. This drawback was improved by adding NaOH (500 ppm relative to weight of SMA). As shown in Inventive Example 1, the $T_g$ was elevated above 190° C. while $D_f$ remained at the same level.

Aniline modified SMA polymers were used as the hardener in the thermosetting epoxy composition. A typical varnish formulation is listed in Table 2.

TABLE 2

| Varnish Formulation | Solid weight (g) |
|---|---|
| D.E.R.™ 560 | 41 |
| D.E.N.™ 438 | 3 |
| Modified SMA 40 | 56 |
| 2-Methyl imidazole | 0.02 |

The following Tables 3 and 4 show that a small amount of metal ion (ppm level) can have a significant effect on increasing the $T_g$ of the formulation.

TABLE 3

| Example | 2 | 3 | Comp. Ex. C | 4 | 5 | 6 | 7 |
|---|---|---|---|---|---|---|---|
| Preparation Method | I (a) | I (b) | I (c) | I (c) | I (c) | I (c) | I (c) |
| $T_g$ (° C., DSC) | 197 | 193 | 140 | 186 | 199 | 182 | 171 |
| Metal ion additive | NaOAc | NaOAc | none | NaOAc | NaOAc | KCl | Zn(OAc)$_2$ |
| metal ion content (ppm, based on varnish resin solid) | 238 | 57 | ~0 | 56 | 280 | 1000 | 1000 |

For examples 2 and 3, the metal ion was the residue from the reaction. In examples 4 to 7, the metal ion was directly added into the varnish.

Examples 2 and 3 showed cured resins having a high $T_g$ (>190° C.), much higher than that of common FR4 formulations. Different solvents did not have a significant impact on $T_g$. Comparative Example C showed that without a metal ion in the formulation, the $T_g$ of the cured resin was only 140° C. When more sodium salt was added into the varnish, a cured product with a higher $T_g$ was the result (as seen in Examples 4 and 5). Examples 6 and 7 showed that potassium and zinc ions can also increase $T_g$ with a certain loading in the varnish. These results indicated that no matter where the metal ion came from, from a synthetic reaction or an extra addition, a significant $T_g$ increase (30~60° C.) was observed.

TABLE 4

| | Example | | | |
|---|---|---|---|---|
| | 8 | 9 | 10 | Comp. Ex. D |
| Preparation Method | II (a) | II (a) | II (a) | II (b) |
| $T_g$ (DSC, ° C.) | 193 | 191 | 193 | 144 |
| Metal ion additive | NaOH | Na$_2$CO$_3$ | LiOH | none |
| Metal ion content (ppm, based on varnish resin solid) | 203 | 224 | 68 | ~0 |

In examples 8-10, the metal ion was the residue from the reaction.

Comparative Example D showed that without metal ion in the formulation, $T_g$ was only 144° C. When sodium or lithium ions existed in the formulation, the $T_g$ increased to greater than 190° C. (examples 8-10). According to the results of Tables 3 and 4, both methods I and II can produce the desired modified SMA polymer which can generate a very high $T_g$ in a cured epoxy resin.

Laminate Data

TABLE 5

| | Formulation | Inventive example 11 | Inventive example 12 | Comp. Ex. E (Megtron 4, from Panasonic TDS) |
|---|---|---|---|---|
| Component | D.E.R.™ 560 | 41 | 36 | |
| | D.E.N.™ 438 | 3 | 6 | |
| | TBBA | 0 | 4 | |
| | Modified SMA | 56$^a$ | 54$^b$ | |
| | Filler (megasil 525) | 25 | 0 | |
| | 2-Methyl imidazole | 0.01 | 0.01 | |
| Laminate evaluation | glass cloth | 8 ply@7628 | 8 ply@2116 | 8 ply@3313 |
| | $D_k$ (1 GHz) | 4.05 | 3.75 | 3.80 |
| | $D_f$ (1 GHz) | 0.005 | 0.006 | 0.005 |
| | $T_g$ (° C., DSC) | 192 | 187 | 176 |
| | $T_d$ (° C., 5% wt loss) | 359 | 359 | 360 |
| | T288 (min, unclad) | 34 | >60 | NA |
| | Thickness (mm, unclad) | 1.61 | 0.95 | 0.80 |
| | CPS (1 Oz Cu, lb/in) | 5.6 | 6.0 | 6.9 |
| | Water uptake (PCT, 2 h) | 0.17% | 0.38% | 0.14% |
| | Solder dip (10 s@288° C., 5 cycles) | 100% pass | 100% pass | NA |
| | UL-94 ranking | V-0 | V-0 | V-0 |

Note:
$^a$prepared by method I (b);
$^b$prepared by method II (a)

Laminate properties were evaluated based on the formulations listed in Table 5. Megtron 4 from Panasonic, a poly(phenylene ether) compound was chosen as Comparative Example E. The inventive examples 11 and 12 exhibited excellent dielectric and thermal performances. The $T_g$ was higher than that of Comparative Example E by more than 10° C. The $D_k$ and $D_f$ values were sufficiently low to meet industrial requirements, and were similar to those of Comparative Example E. Other performances such as $T_d$, T288, copper peel strength, and water uptake were also comparable to those of Comparative Example E.

Test Methods

Gelation Time Test

The resin formulations were evaluated for its gelation time via stroke cure on a 171° C. hot plate.

Glass Transition Temperature ($T_g$)

Glass transition temperature was determined by Differential Scanning Calorimetry (DSC) using a Q2000 machine from TA Instruments. Typically, a thermal scan ranges from room temperature to 250° C. and heating rate of 10° C./min was used. Two heating cycles were performed, with the curve from the second cycle used for $T_g$ determination by "middle of inflection" method.

Alternatively, the glass transition temperature was determined from tangent delta peak on a RSA III dynamic mechanical thermal analyzer (DMTA). Samples were heated from 20° C. to 250° C. at a heating rate of 3° C./min. Test frequency was 6.28 rad/s.

Thermal Decomposition Temperature ($T_d$)

The cured resin was evaluated on a Q50 machine from TA Instruments. The heating rate was 10° C./min. The $T_d$ is defined as temperature at 5% weight loss.

Time to Delamination at 288° C. (T288)

The time to delamination at 288° C. (T288) was determined using a thermal mechanical analyzer, TA Instruments Q400. The time to delamination was determined as the elapsed time from when the temperature reached 288° C. to when a sudden significant dimensional change (~100 mm) occurred.

Dielectric Constant ($D_k$)/Dissipation Factor ($D_f$)

An epoxy plaque was made for dielectric measurement. Prepreg powder was put on a flat aluminum foil, and then the aluminum foil with the powder was placed on a flat metal plate. The assembly was heated to 200° C. until the epoxy powder melted. The melted powder was covered with another aluminum foil and then a flat metal plate was placed on the aluminum foil. The assembly was hot pressed at 200° C. for 1 hour and then post-cured at 220° C. for 3 hours. An air bubble-free epoxy plaque with a thickness between 0.5 and 0.8 mm was obtained.

Laminate samples were directly used for dielectric measurement.

The dielectric constant and dissipation factor were determined by an Agilent E4991A RF Impedance/Material Analyzer equipped with Agilent 16453A test fixture under 1 GHz at 24° C. following ASTM D-150.

Copper Peel Strength (CPS) Copper peel strength was measured using an IMASS SP-2000 slip/peel tester equipped with a variable angle peel fixture capable of maintaining the desired 90° peel angle throughout the test. For the copper etching, 2"×4" copper clad laminates were cut. Two strips of ¼" graphite tape were placed lengthwise along the sample on both faces of the laminate with at least a ½" space between them. The laminate pieces were then placed in a KeyPro bench top etcher. Once the samples were removed from the etcher and properly dried, the graphite tape was removed to reveal the copper strips. A razor blade was used to pull up ½ of each copper strip. The laminate was then loaded onto the IMASS tester. The copper strip was clamped and the copper peel test was conducted at a 90° angle with a pull rate of 2.8 in/min.

Press Cooking Test (PCT)

Copper-unclad laminate was cut into 4 pieces with a size of 2 inch×3 inch. The samples were weighted accurately and then put in the autoclave (Thermo Electron Corp. 8000-DSE). The samples were treated under the 121° C. water vapor for 2 hours. The surface water was wiped and the samples were weighted accurately again to calculate the average water uptake.

Solder Dip

The laminate samples after PCT were dipped into the solder bath at 288° C. for 5 cycles (10 seconds a cycle). Blisters on the sample indicated the sample failed to pass the test. Results were reported by counting the passing samples out of the total samples tested.

UL94 Flame Retardancy Test

Each of five specimens (13 cm×12 mm) was ignited twice for 10 seconds in the standard UL94 test chamber (Atlas UL94 Chamber VW-1). The time from leaving the ignition source to self-extinguish was recorded as the burning time. UL94 V0 rating requires less than 10 seconds of the burning time for each ignition and less than 50 seconds of the total burning time for 10 ignitions.

What is claimed:

1. A curable composition, comprising:
   an epoxy resin; and
   a hardener compound for curing with the epoxy resin, the hardener compound comprising:
   a polymer comprising a first constitutional unit having a formula of

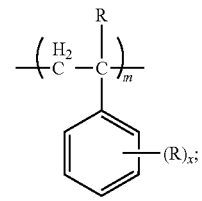

and a second constitutional unit having a formula of

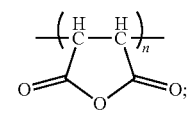

and a third constitutional unit having a formula selected from the group consisting of

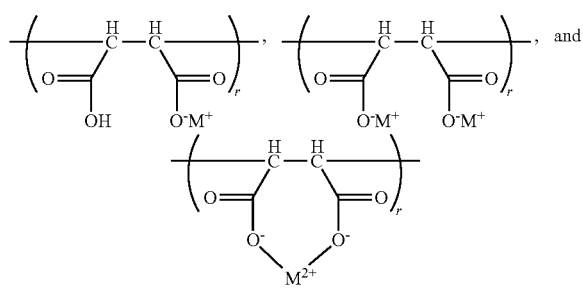

wherein each m, n, and r is independently a real number that represents a mole fraction of the respective constitutional unit in the polymer, each R is independently a hydrogen, a halogen, an aromatic group or an aliphatic group, M+ and M2+ are metal ions and wherein the molar ratio of the epoxy group to the second constitutional unit is in the range of from 0.5:1 to 5:1.

2. The curable composition of claim 1, further comprising a fourth constitutional unit having a formula of

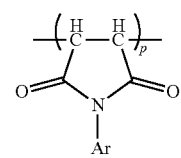

wherein p is a real number that represents a mole fraction of the fourth constitutional unit in the polymer, and Ar is an aromatic group.

3. The curable composition of claim 1 wherein at least a portion of the second constitutional unit is converted to an imide or an amic acid by treatment with an amine-containing compound.

4. The curable composition of claim 1, where the third constitutional unit constitutes 0.005% to 10% by weight of the polymer.

5. The curable composition of claim 1, wherein the ratio of r/(n+r) or r/(n+p+r) is in the range from 0.001 to 0.1.

6. The curable composition of claim 1, further comprising a flame retardant.

7. The curable composition claim 1, of wherein said first constitutional unit is styrene.

8. The curable composition of claim 1, wherein said second constitutional unit is maleic anhydride.

9. The curable composition of claim 1, wherein the metal ion is selected from the group consisting of sodium, potassium, lithium, and zinc.

10. The curable composition of claim 1, wherein the metal ion is obtained from a base compound selected from the group consisting of sodium hydroxide, sodium carbonate, sodium acetate, zinc acetate, lithium hydroxide, potassium carbonate, potassium chloride, and potassium hydroxide.

11. The curable composition of claim 1, where a cured product of the curable composition has a glass transition temperature of at least 150° C.

12. The curable composition of claim 1, where the first constitutional unit to the second constitutional unit has a molar ratio in a range of 1:1 to 20:1.

13. The curable composition of claim 1, where the second constitutional unit constitutes 0.1 percent (%) to 49% by weight of the polymer.

14. The curable composition of claim 1, where the epoxy resin is selected from the group consisting of aromatic epoxy compounds, alicyclic epoxy compounds, aliphatic epoxy compounds, and combinations thereof.

15. A prepreg comprising a reinforcement component and the curable composition of claim 1.

16. An electrical laminate structure that comprises a reaction product of the curable composition of claim 1.

17. The curable composition of claim 1, wherein said first constitutional unit is styrene and said second constitutional unit is maleic anhydride.

18. The curable composition of claim 17, wherein a cured product of the curable composition has a glass transition temperature of at least 150° C. and where the first constitutional unit to the second constitutional unit has a molar ratio in a range of 1:1 to 20:1.

19. A method of preparing a curable composition, comprising:
providing an epoxy resin; and
reacting the epoxy resin with a hardener compound, the hardener compound comprising:
a polymer comprising a first constitutional unit with a formula of

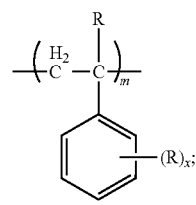

a second constitutional unit having a formula of

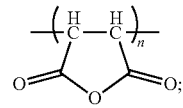

and a third constitutional unit having a formula selected from the group consisting of

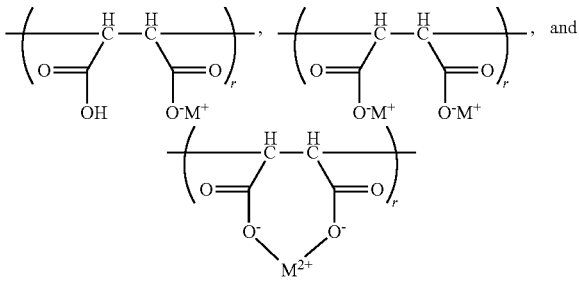

wherein each m, n, and r is independently a real number that represents a mole fraction of the respective constitutional unit in the polymer, each R is independently a hydrogen, a halogen, an aromatic group or an aliphatic group, M+ and M2+ are metal ions and wherein the molar ratio of the epoxy group to the second constitutional unit is in the range of from 0.5:1 to 5:1.

20. The method of claim 19, wherein the hardener compound further comprises a fourth constitutional unit having a formula of

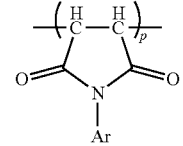

wherein p is a real number that represents a mole fraction of the fourth constitutional unit in the polymer, and Ar is an aromatic group.

* * * * *